(12) United States Patent
Song

(10) Patent No.: US 7,730,402 B2
(45) Date of Patent: Jun. 1, 2010

(54) INPUT METHOD, SYSTEM AND DEVICE

(76) Inventor: Andy Zheng Song, 1/29 The Parade, Clarinda, Victoria, 3169 (AU)

( * ) Notice: Subject to any disclaimer, the term of this patent is extended or adjusted under 35 U.S.C. 154(b) by 0 days.

(21) Appl. No.: 10/579,054

(22) PCT Filed: Nov. 12, 2004

(86) PCT No.: PCT/AU2004/001565

§ 371 (c)(1), (2), (4) Date: May 11, 2006

(87) PCT Pub. No.: WO2005/048093

PCT Pub. Date: May 26, 2005

(65) Prior Publication Data

US 2007/0083276 A1    Apr. 12, 2007

(30) Foreign Application Priority Data

Nov. 13, 2003  (NZ) ..................... 529518

(51) Int. Cl.
- G06F 3/01 (2006.01)
- G06F 3/14 (2006.01)
- G06F 19/00 (2006.01)

(52) U.S. Cl. ............ 715/702; 715/864; 463/37
(58) Field of Classification Search ........... 345/864; 463/37; 715/702

See application file for complete search history.

(56) References Cited

U.S. PATENT DOCUMENTS

| | | | | |
|---|---|---|---|---|
| 4,413,314 A * | 11/1983 | Slater et al. | .................. | 700/83 |
| 4,933,514 A | 6/1990 | Bowers | | |
| 5,943,043 A * | 8/1999 | Furuhata et al. | ............. | 345/173 |
| 6,028,581 A * | 2/2000 | Umeya | ..................... | 345/104 |
| 6,239,389 B1 * | 5/2001 | Allen et al. | ............... | 178/18.01 |
| 6,535,200 B2 * | 3/2003 | Philipp | ...................... | 345/168 |
| 6,542,950 B1 * | 4/2003 | Bodnar | ...................... | 710/260 |
| 6,570,557 B1 * | 5/2003 | Westerman et al. | ......... | 345/173 |
| 6,633,865 B1 * | 10/2003 | Liao | ................................ | 707/3 |
| 6,650,319 B1 * | 11/2003 | Hurst et al. | .................. | 345/173 |
| 6,757,002 B1 * | 6/2004 | Oross et al. | .................. | 715/864 |
| 6,856,259 B1 * | 2/2005 | Sharp | ............................. | 341/5 |

(Continued)

FOREIGN PATENT DOCUMENTS

EP    0 457 990 A2    11/1991

(Continued)

OTHER PUBLICATIONS

Yujin Tsukada, Layered Touch Panel: The Input Device with Two Touch Panel Layers, Apr. 20-25, 2002, CHI, pp. 584-585.*

Primary Examiner—William L Bashore
Assistant Examiner—David Phantana-angkool
(74) Attorney, Agent, or Firm—Oliff & Berridge, PLC

(57) ABSTRACT

A method and system are provided for entering input into a computing system. The method involves detecting one or multiple input movements using a sensing panel associated with the computing system and classifying each detected input movement as being of a particular type. Each detected input movement is translated to an instruction signal by consulting a knowledge database. The instruction signals are transmitted to the computing system for execution. Translation of a detected input movement to an instruction signal involves a main process and one or more sub-processes, wherein each sub process is invoked by the main process in response to a particular type of detected input movement.

22 Claims, 16 Drawing Sheets

U.S. PATENT DOCUMENTS

| | | | |
|---|---|---|---|
| 6,888,536 B2 * | 5/2005 | Westerman et al. | 345/173 |
| 7,042,444 B2 * | 5/2006 | Cok | 345/173 |
| 7,254,775 B2 * | 8/2007 | Geaghan et al. | 715/701 |
| 7,339,580 B2 * | 3/2008 | Westerman et al. | 345/173 |
| 7,643,011 B2 * | 1/2010 | O'Connor et al. | 345/173 |
| 2002/0093491 A1 * | 7/2002 | Gillespie et al. | 345/173 |
| 2003/0063073 A1 * | 4/2003 | Geaghan et al. | 345/173 |
| 2003/0076306 A1 * | 4/2003 | Zadesky et al. | 345/173 |
| 2004/0140993 A1 * | 7/2004 | Geaghan et al. | 345/702 |

FOREIGN PATENT DOCUMENTS

| | | |
|---|---|---|
| EP | 1 098 241 A2 | 5/2001 |
| WO | WO 91/06939 A1 | 5/1991 |
| WO | WO 96/11435 A1 | 4/1996 |
| WO | WO 03/071411 A1 | 8/2003 |

* cited by examiner

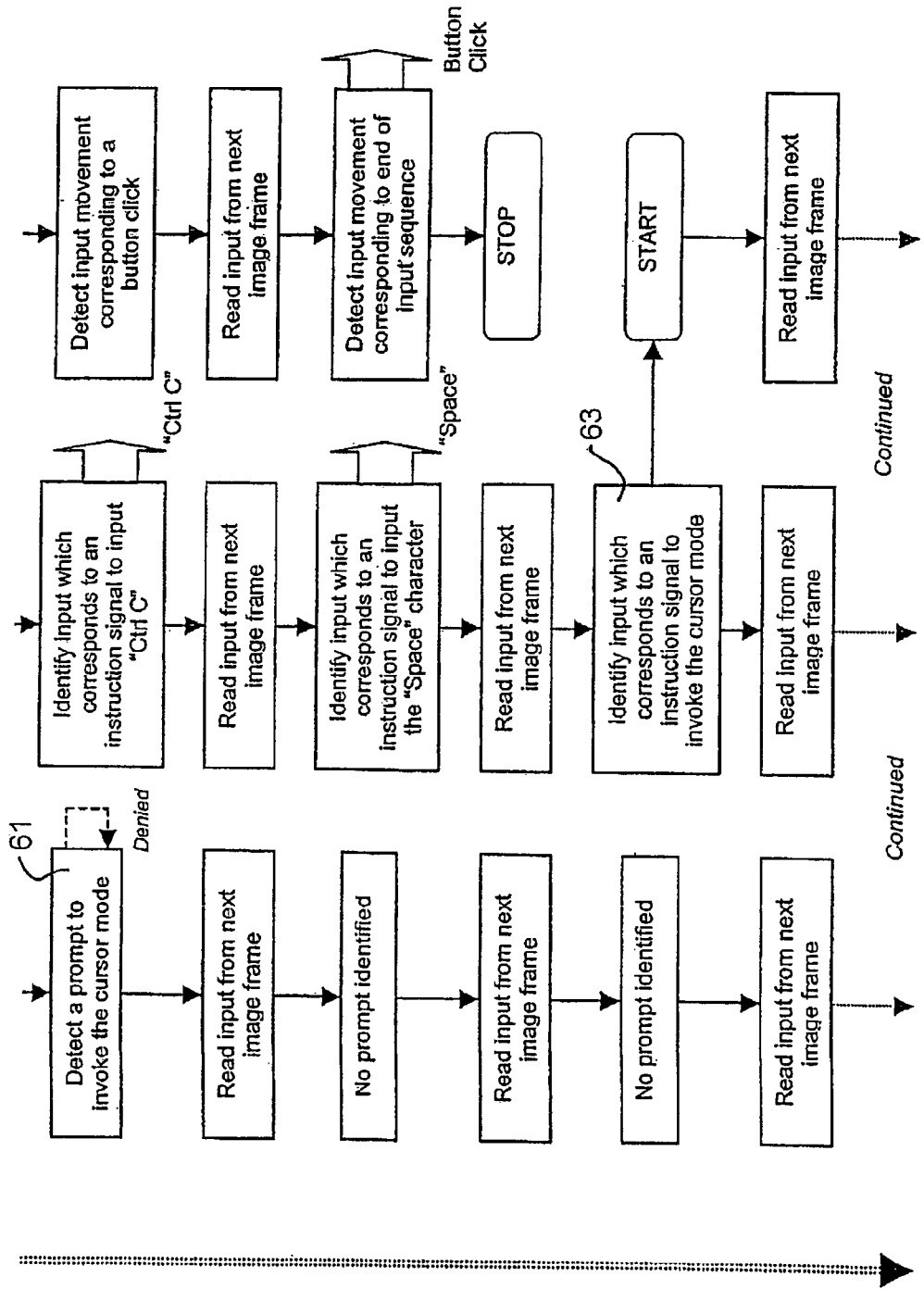

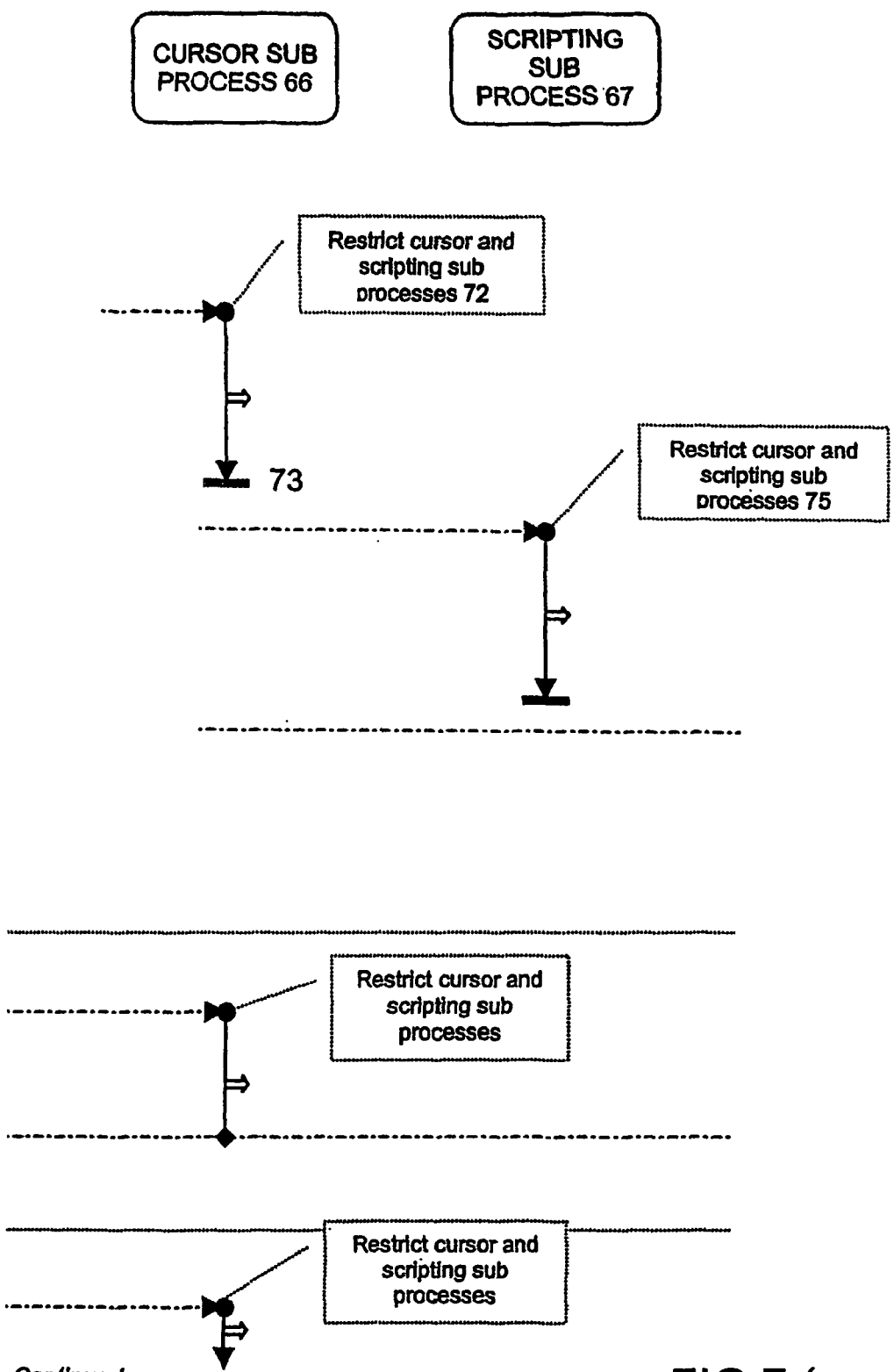
FIG 7 (cont i)

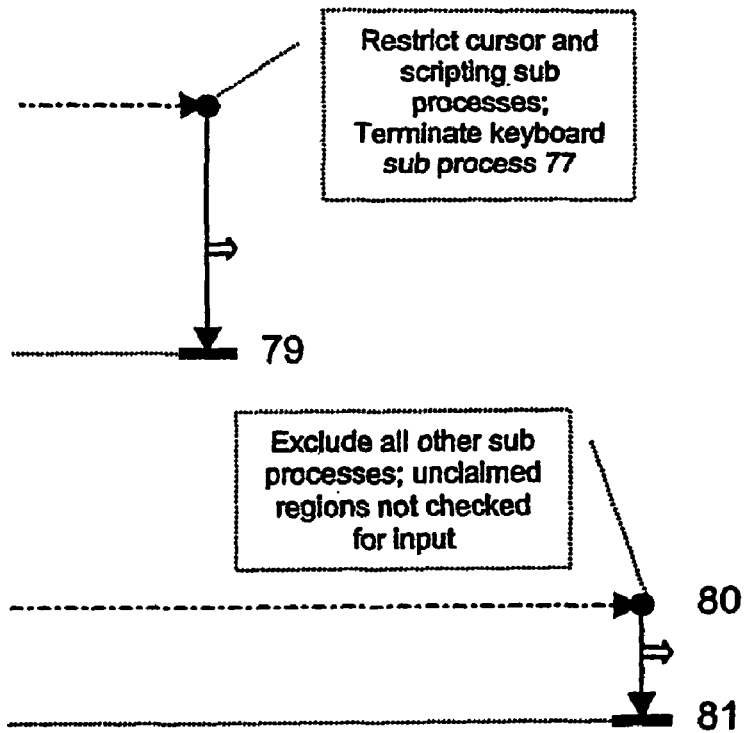
FIG 7 (cont ii)

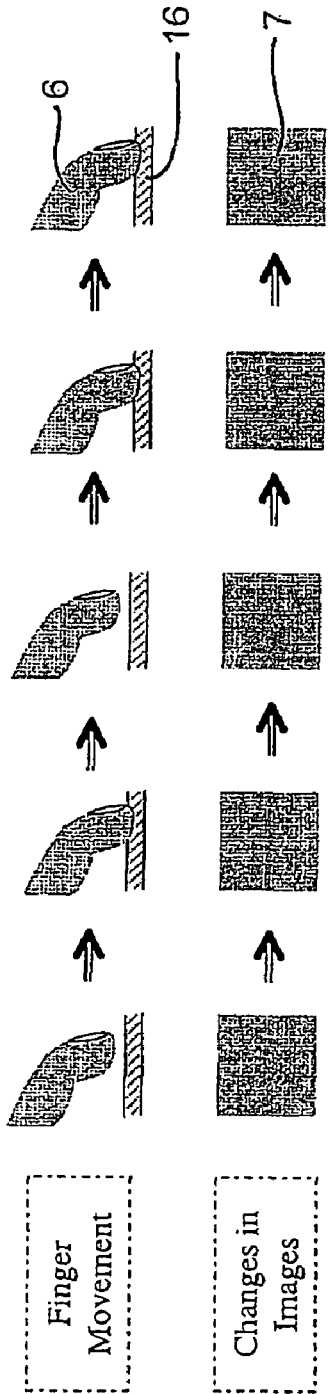
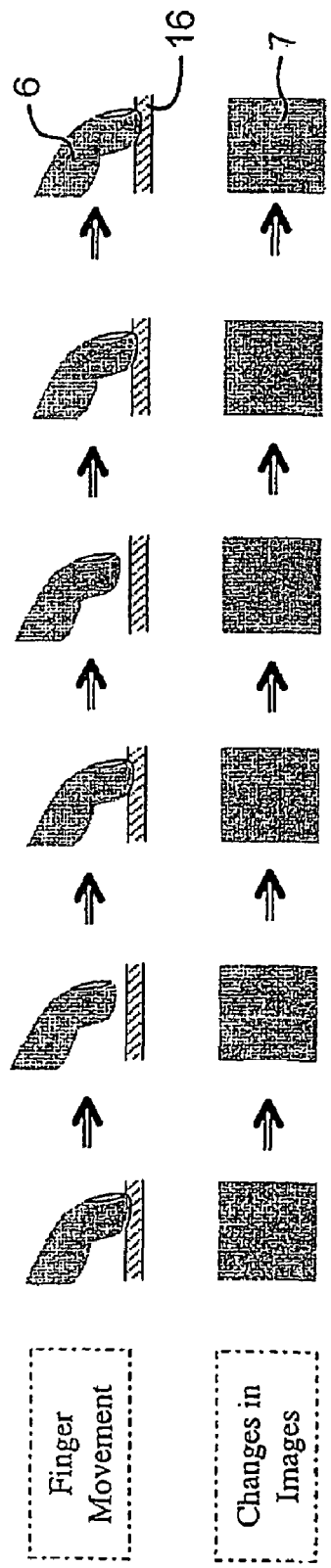
FIG 10

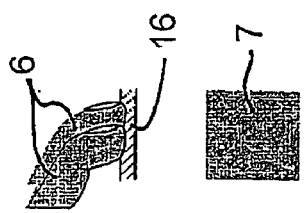
FIG 11

INPUT METHOD, SYSTEM AND DEVICE

FIELD OF THE INVENTION

The present invention relates generally a method for entering input into a computing system and an input device for use with a computing system. More particularly, the invention relates to methods and apparatus for sensing tactile input.

BACKGROUND TO THE INVENTION

Many prior art methods exist for entering input into a computing system. The most widely accepted methods involve the use of a keyboard to input character data. A mouse is often used in conjunction with a keyboard to manipulate the position of a cursor on the screen by translating movement of the mouse across a substantially flat surface into a corresponding movement of the cursor on screen.

Touch screens have become increasingly popular as input devices, particularly for non technical applications such as public information displays. Touch screens include a touch sensor panel placed over a display screen so that the touch sensitive area of the sensor panel covers the viewable area of the display. Various types of touch sensor systems are available based on resistance, capacitance or ultrasonic methods to detect input by touch. A sensor panel typically includes an electrical current passing over it such that touching the screen causes a change in electrical signal. The change in electrical signal is used to determine the position of the touch on the display screen.

Graphics tablets are a form of computer input device which operates in conjunction with a stylus for drawing and editing images or for performing typical mouse-type functions. Graphics tablets are particularly suited to drafting, sketching and so forth. Other computing system input devices such as rollers, thumbwheels and trackballs are useful for panning and scrolling functions.

However, each prior art input method is typically suited to a specific type of input and becomes awkward and inefficient to use when employed to enter other types of input into a computing system. For instance, whilst a keyboard offers superior efficiency for typing applications, it is not particularly suitable for manipulation of graphic objects and the like. For both technical and non technical computing system operators, the variety of tasks that a single operator may encounter over a single day may call for a number of input devices. This leads to the inconvenience of switching between input devices and the disadvantage of having a number of input devices connected to a computing system. In addition, it is recognised that many existing input devices have not been designed with ergonomics in mind, making them awkward to use and predisposing users to problems including repetitive strain injuries.

Some prior art devices and systems exist which operate via tactile sensing means to provide data input to a computing system. These devices typically use finger positioning on a capacitance, resistance or ultrasonic touch pad in place of other input devices. Changes in conditions caused by a finger touching the touch pad are detected by sensors. By sensing the position of a finger at consecutive intervals, the motion of the finger can be monitored. Such sensing devices may be used to manipulate movement of a cursor on a computer screen. However, such prior art tactile sensing devices have not been widely accepted. Touch sensitive keyboards tend to be harder to use and produce more errors. The limited range of movement and resolution of pointing type devices often leads to slower and less accurate output than individual input devices.

A number of integrated input devices also exist which combine functionalities such as keyboard and mouse into a single device. However, integration of a number of functionalities into a single input device may add an undesirable level of mechanical complexity to the device.

The discussion of the background to the invention included herein is included to explain the context of the invention. This is not to be taken as an admission that any of the systems referred to were published, known or part of the common general knowledge as at the priority date of the claims.

SUMMARY OF THE INVENTION

According to a first aspect of the present invention, there is provided a method of entering input into a computing system, the method comprising the following steps:

detecting one or multiple input movements using a sensing panel associated with the computing system;

classifying each detected input movement as being of a particular type;

translating each input movement to an instruction signal by consulting a knowledge database; and transmitting the instruction signal to the computing system;

wherein translation of a detected input movement to an instruction signal involves a main process and one or more sub-processes, wherein each sub process is invoked by the main process in response to a particular type of detected input movement.

The sensing panel comprises an array of sensors for generating images of a contact area for receiving input movements. The input movements may be executed by a user's finger or fingers, or any suitable peripheral device such as a pen, stylus or any other implement whose movement may be sensed by the panel. The sensing panel detects changes in the position of a user's finger or a peripheral device between images. Processing of the input movements is preformed by a processor and involves consulting a knowledge database to translate the detected input movements into corresponding instruction signals which have been previously mapped to the knowledge database.

In a preferred embodiment of the present invention, each particular type of input movements is associated with operation of the sensing panel in a different mode. That is, singular pecking movement which simulates typing a key may be associated with operation of the device in a keyboard mode, whilst a sliding motion may be associated with a cursor mode or a mouse mode. Other types of modes may include scripting modes which may be used for freehand writing or drawing and the like as well as for sending commands, device modes which operate in association with peripheral devices, customer modes which comprise user defined modes and idle modes. Whilst a main process may manage any number of sub processes, each sub process is assigned to translation of an input movement into an instruction signal.

According to an embodiment; the main process and one or more sub processes together form a hierarchical control structure in which the main process determines whether an input movement corresponds to a prompt to invoke a particular mode, and where a particular mode is indicated, the main process invokes a sub process in that mode.

The term "Process" as used in this specification refers to any execution procedure including a thread or a task and is not limited to "an instance of a program running in a computer" or any other limited definition which may be used in computer science.

In a preferred form of the invention, the main process manages one or more sub processes by assigning a priority value such that a sub process having a minor priority value does not impede a sub process having a major priority value.

Each currently operating sub process is assigned a priority value to avoid interference between conflicting sub processes. Priority values may be assigned according to factors including the order in which the sub processes were requested and the mode associated for the sub process.

Preferably, each invoked sub process claims a region of the sensing panel such that any input movements received via the claimed region of the sensing panel will be translated by the sub process having claimed the region.

More preferably each input received via a region having been claimed by a sub process translated only by the sub process having claimed that region of the sensing panel, or by a sub process having a higher priority value than the sub process having claimed that region of the sensing panel.

Once the claiming sub process is complete, the claimed region may revert to an unclaimed status.

According to a second aspect of the present invention, there is provided an input system for a computing system, the input device comprising:

a sensing panel including an array of sensors for detecting input movements;

a processor for classifying each detected input movement as being of a particular type and translating each input movement to an instruction signal for transmission to the computing system; and a knowledge database for consultation by the processor to identify the instruction signal corresponding to the detected input movement;

wherein translation of a detected input movement to an instruction signal involves a main process and one or more sub-processes, wherein each sub process is invoked by the main process in response to a particular type of detected input movement.

Preferably, the sensors for detecting input movements are light detecting sensors. The array of sensors record light falling on them and generate images of the panel providing the contact surface for the input device. The sensors generate images of the contact surface and detect changes between images recorded in sequence which are identified as input movements. The light detecting sensors may comprise any suitable sensor such as a charge-coupled device (CCD) array but is most preferably an array of complementary metal oxide semiconductor sensors (CMOS).

The sensing panel may further include a display layer for guiding user input.

The knowledge database may be dynamic, allowing an operator to change or redefine the database to fit individual circumstances. The knowledge database may interact with external applications and can be modified externally by host computing system, independent application software and external devices. The data in the knowledge database may be supplied partially or completely by the computing system, independent application software and/or external devices, so that the knowledge database is customised according to the needs of the computing system, independent application software and/or external devices. The customised knowledge database may form an integral part of the computing system, independent application software and/or external devices.

According to another embodiment of the invention, there is provided an input device for use with a computing system for entering input into the computing system, the input device comprising a sensing panel and a transmission component for transmitting detected input movements to a processor to identify an instruction signal corresponding to the detected input movement in accordance with the method described.

The input device is able to connect to connection ports such as serial ports for connecting a keyboard or mouse. The device components may be integrated into a single mechanical device, or alternatively, may be hosted on another device, such as the computing system to which they are providing a means of entering input. For instance, the sensing panel could transmit input movements to a processor associated with the computing system to enable a sharing of resources.

The input device may further include computer software which causes the processor to operate using a hierarchical control structure including one or more sub processes to be invoked in response to a particular type of detected input movement such that the sub process can associate the detected input movements with an appropriate instruction signal.

BRIEF DESCRIPTION OF THE DRAWINGS

The invention will now be described in further detail by reference to the attached drawings illustrating example forms of the invention. It is to be understood that the particularity of the drawings does not supersede the generality of the preceding description of the invention. In the drawings:

FIG. 10 illustrates more examples of user input patterns used to provide input to a computing system in accordance with an embodiment of the invention.

FIG. 11 illustrates more examples, of user input patterns used to provide input to a computing system in accordance with an embodiment of the invention.

DETAILED DESCRIPTION OF THE DRAWINGS

Figure 1:
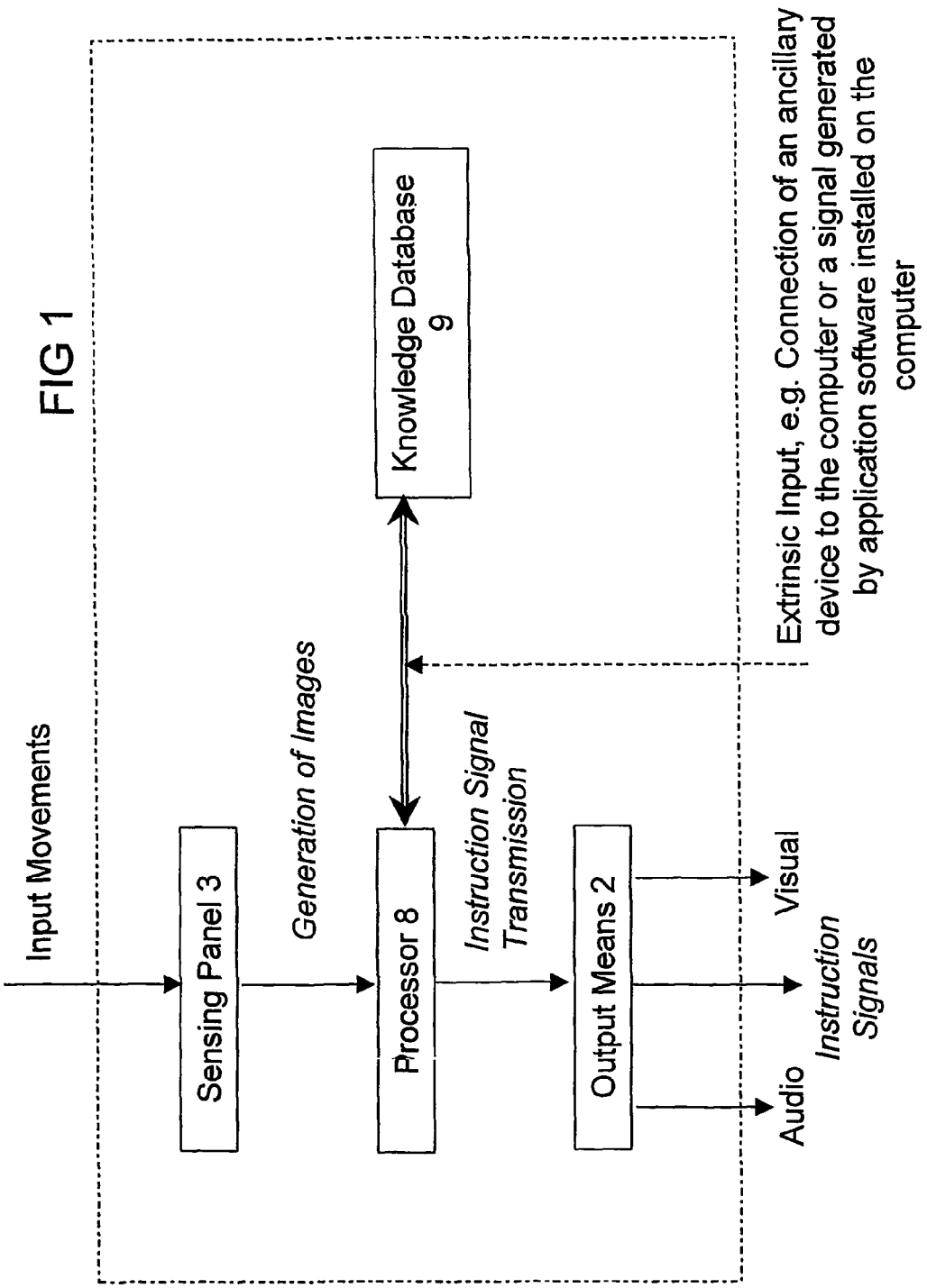
FIG. 1 is a schematic representation of interactions between components of an input system, according to an embodiment of the present invention.

FIG. 1 is a schematic representation of interactions between independent components of an input device. The input device provides input to a computing system connected to the output means 2. A sensing panel 3 provides a contact surface 4 (see FIG. 2) to the user. The sensing panel 3 includes an array of sensors 5 (see FIG. 2) which detect input movements entered by a user using single or multiple fingers or a peripheral device such as a pen or stylus. The array of sensors 5 generates an image of the contact surface 4 to enable detection of changes between sequentially recorded images. These changes are identified as input movements. A processor 8 processes the images by consulting a knowledge database 9 to identify a corresponding instruction signal for each detected input movement. The instruction signals are transmitted to a computing system to provide appropriate output.

The system components may be integrated into a single device, or alternatively integrated with other devices such as a computing system. For example, the sensing panel 3 may be connected to a computing system to which it provides input, whilst the processor 8 and knowledge database 9 are integrated with the computer system. In this type of arrangement, the processor 8 shares resources with the computer system. In an alternate arrangement the sensing panel 3, processor 8 and knowledge database 9 may be incorporated into a single unit further including an output means 2, for example, a screen for visual output or speakers for auditory output. Where the components are provided as discrete units, connection means must be provided to facilitate communication between devices.

Figure 2:
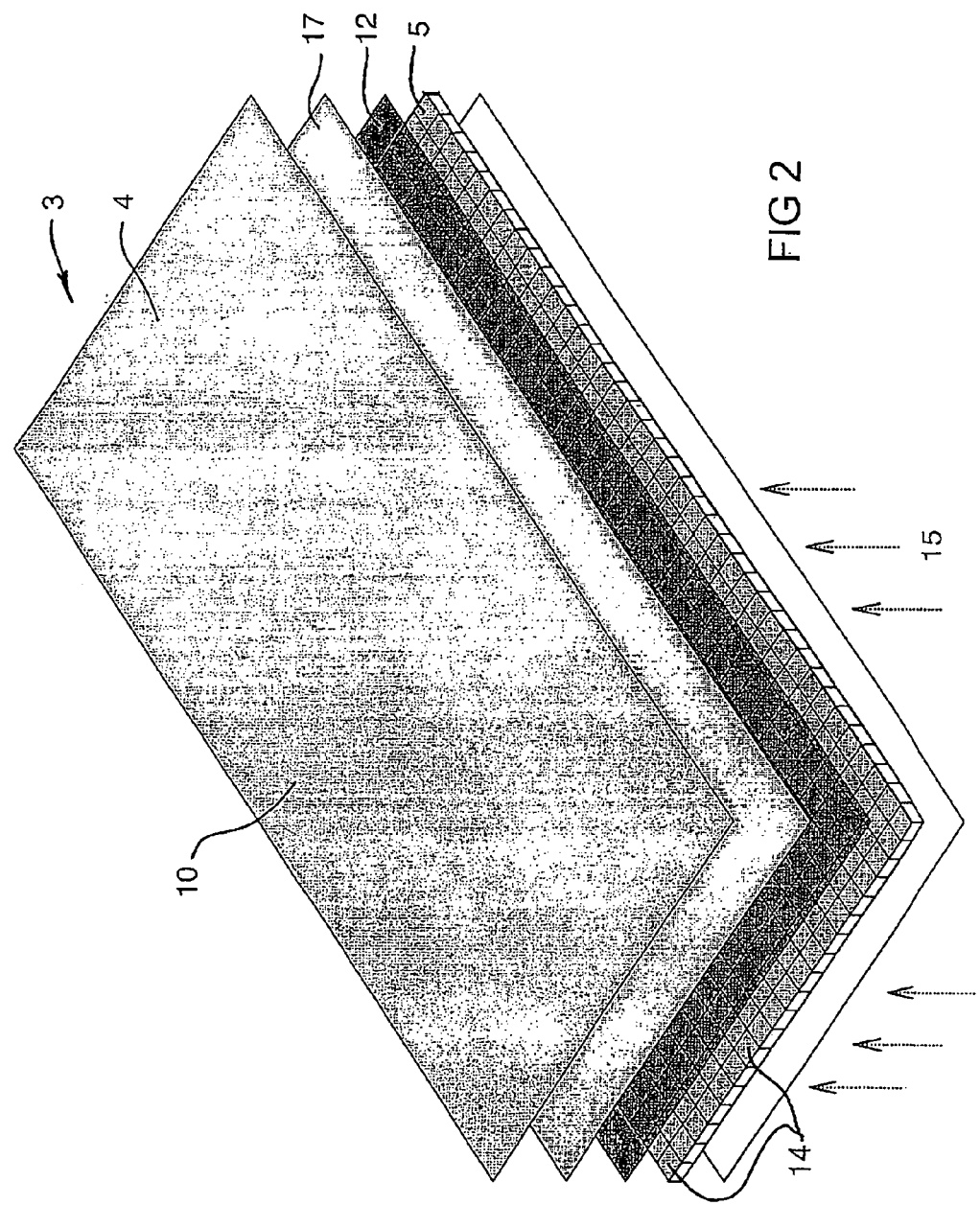
FIG. 2 illustrates a simplified structure of the sensing panel having an array of sensors.

FIG. 2 illustrates a simplified structure of the sensing panel 3 including an array of sensors 5 for use with the present invention. The sensing panel 3 is constructed in several layers. An upper layer 10 provides a contact surface 4 to receive input movements entered by a user. The upper layer 10 comprises a detachable, transparent and flexible surface, which optionally has a keyboard layout 11 (see FIG. 8) printed on its upper surface. Beneath the upper layer is a transparent a resilient layer 12 is provided to offer protection to underlying layers and to provide tactile feedback to the user. The transparent resilient layer 12 is designed to minimize any strain associated with the impact of typing on a user's fingers. Furthermore, the keyboard layout 11 may be adapted to each individual users preferences, making it possible to provide an ergonomic typing system to suit individual user's hand sizes and input requirements.

Beneath the transparent resilient layer 12 is an array of light sensors 5 for detecting the input movements received via the contact surface 4. The light detecting sensors are most preferably CMOS sensors. These sensors detect light patterns for subsequent transformation into images or electrical charge patterns. A circuit board located beneath the sensing layer 5, to collect signals from the array of sensors 5 and generate the images which are then processed by the processor 8. Each pixel on the resulting image may correspond to a single sensor 14, that is, the position of the pixel in the image is directly related to the position of the sensor 14 within the array of sensors 5. Alternatively, a single pixel on the resulting image may correspond to any number of sensors 14. Similarly, it is to be understood that a single sensor 14 could provide input corresponding to any number of pixels on the resulting image. The value of each pixel is dependent on the magnitude of the signal generated by the corresponding sensor 14. A back lighting source 15 is optionally incorporated into the sensing panel 3. In this arrangement, the light patterns detected by the sensors 14 will be based on reflection patterns.

The placement of fingers or some peripheral device on the contact surface 4 creates an impression on the upper layer 10 of the sensing panel 3 comprising an input movement. An input movement causes the amount of light received by individual sensors 14 to vary from regions of the contact surface 4 which do not assume the impression of a finger or peripheral device. Therefore, the image formed in one particular frame whilst a user is entering an input movement, will vary from an image formed when no finger or peripheral device is connecting with the contact surface 4.

As an alternative to having the keyboard layout 11 printed on the sensing panel 3, the sensing panel 3 may further include a display layer 17. Such a display layer 17 may comprise a flexible liquid crystal display (LCD) positioned between the contact surface 4 and the array of sensors 5. The LCD layer 17 may be used to display information and guide user input, such as a keyboard layout 11. It is to be appreciated that where a LCD 17 is used to display a keyboard layout, a dynamic display is enabled thereby permitting the keyboard layout to be redefined in response to changes in a user's needs.

In another form of the invention not illustrated here, the sensing panel 3 includes a detachable, opaque and flexible layer which optionally has a keyboard layout printed thereon. The inner surface of the upper layer 10 is coloured in a uniform block colour such as black, blue or red. Beneath the upper layer 10 is a flexible, semi-transparent layer serving a cushioning function. This flexible, semi-transparent layer may comprise a liquid substance.

In this particular arrangement, when a finger or peripheral device connects with the contact surface 4 and leaves an impression thereon, the depth of the underlying liquid layer decreases directly beneath the impression, influencing the manner in which underlying sensors 14 will detect the light reflected by the inner surface of the upper layer 10. Furthermore, comprising the flexible, semi-transparent layer of liquid, enhances tactile feedback to the user. As described previously, a dynamic display means such as an LCD layer 17 may be incorporated into the arrangement.

A processor 8 reads in the sequentially generated image frames in order to translate input movements entered by a user's finger or suitable peripheral device into corresponding instruction signals by consulting a knowledge database 9. The resulting instruction signals are transmitted to a computing system for output. Translation of input movements into instruction signals occurs via a combination of two types of operational processes, main processes 18, and sub-processes 19 (see FIG. 3) creating a hierarchical control structure including one or more sub processes 19 to be invoked by a main process 18 in response to a particular type of detected input movement so that the sub process 19 can associate the detected input movements with an appropriate instruction signal. That is, particular input movements are associated with different operational modes of the sensing panel 3. For example, a single pecking movement simulating typing of a key may signal a prompt for the input device 1 to operate in keyboard mode. Similarly, a sliding finger motion may signal a prompt for the input device 1 to operate in cursor mode. Main processes 18 provide for the management of sub-processes 19 including initiating sub processes, allocating system resources to sub processes, monitoring of sub processes and collecting the instruction signals translated by the sub processes. Each sub process 19 is assigned to the translation of one or more particular input movements into corresponding instruction signals by consulting the knowledge database 9.

The knowledge database 9 is effectively a database including a bank of stored input movements; information regarding the various modes of operation of the input device 1 including keyboard, mouse, scripting, device, customer and idle modes; regions of the images 7 which correspond to particular modes and any functions that are specific to any particular mode.

Figure 3:
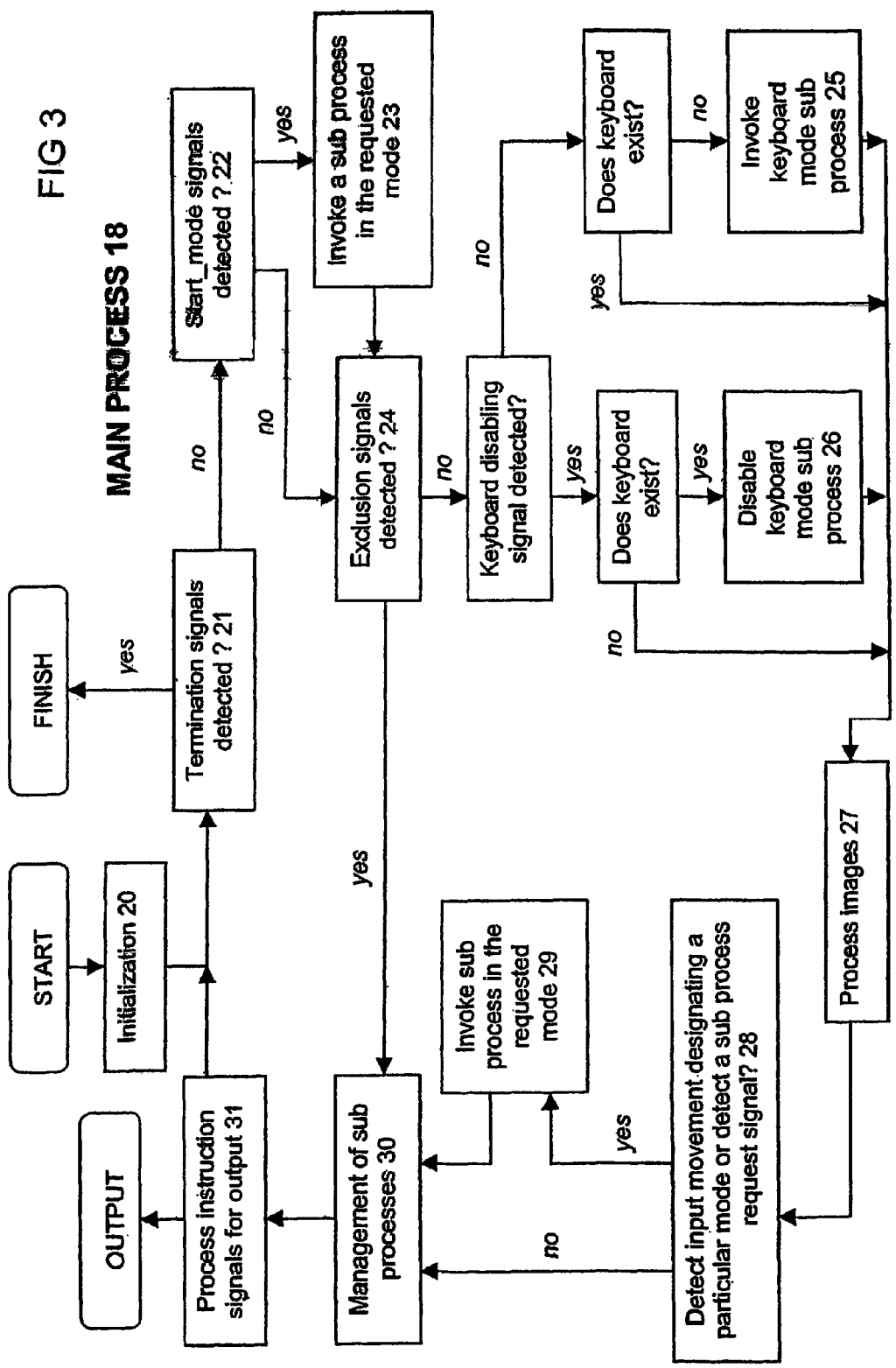
FIG. 3 illustrates a flowchart of example operations of a main process.

FIG. 3 illustrates a flowchart of example operations of a main process 18. In this example, the main process 18 comprises a loop structure. A main process 18 is invoked and proceeds to initialize the system 20. A first step in the loop is to check for any termination signals 21 that signal arrest of the main process 18. An example of a termination signal is the switching off of the power supply.

A second step checks for start_mode signals 22 which request the starting of a sub process in a particular mode. Start_mode signals are not typically generated in response to input movements, but are issued in response to extrinsic factors such as connection of an ancillary device to the computing system or in response to a signal generated by application software installed on the computing system. By way of alternative, start_mode signals may be generated via a manually operable switch providing for selection between different modes. If a start_mode signal is detected, the main process 18 will invoke a sub process in the mode indicated 23. The invoked sub process operates simultaneously to the main process 18. If insufficient central processing units (CPUs) are available, a standard time sharing mechanism may be used to execute multiple processes simultaneously.

A successfully invoked sub process may send exclusion signals 24 to disable other sub processes which operate in conflicting modes. For example, a sub process operating in cursor mode may send an exclusion signal to prevent the input device 1 from concurrently operating in keyboard mode. If a sub process has a higher priority value than other sub processes, the sub process is able to exclude all sub processes that have a lower priority value. When a sub process 23 is invoked and no exclusion signals or termination signals are detected 24, the successfully invoked sub process may send a signal to disable sub processes in keyboard mode. If a keyboard disabling signal is detected and a keyboard sub process exists, then the keyboard mode sub process 26 will be disabled. Similarly, if no keyboard disabling signal is detected and the keyboard sub process does not exist, the keyboard mode sub process is invoked 25 as the default sub process to enable user input.

The next step of the main process 18 is to process consecutive image frames which includes the deployment of known image processing techniques to facilitate the recognition of input movements 27. One such approach is to convert the images into binary form. Binary images are easier to perform operations on, thereby reducing the level of computation required to speed up the process. Comparisons are made between images representing an input movement pattern and a bank of previously defined images that correspond to appropriate instruction signals in the knowledge database 9. A main process 18 thereby establishes whether the input movement corresponds to a prompt to invoke any particular mode 28. Where a particular mode is indicated, the main process 18 invokes a sub process in that mode 29. If a signal requesting a sub process is detected 28, then the corresponding sub process may be invoked. For example, an application software might send a request to start a particular sub process for its needs. Such a request might be sent by a running sub process.

In the event that the input movement detected does not correspond to a prompt for a sub process to be invoked, the main process 18 proceeds directly to management of the sub processes 30. Management of sub processes 30 involves the allocation of system resources to all operating sub processes and monitoring their progress. These functions need only be performed at regular intervals, for example, every two frames or every two seconds.

The final step in the loop is the processing of instruction signals provided by any sub processes and making them available for transmission to the computing system 31. A main process 18 may continue to repeat the loop described until a termination signal is detected 21.

Figure 4:
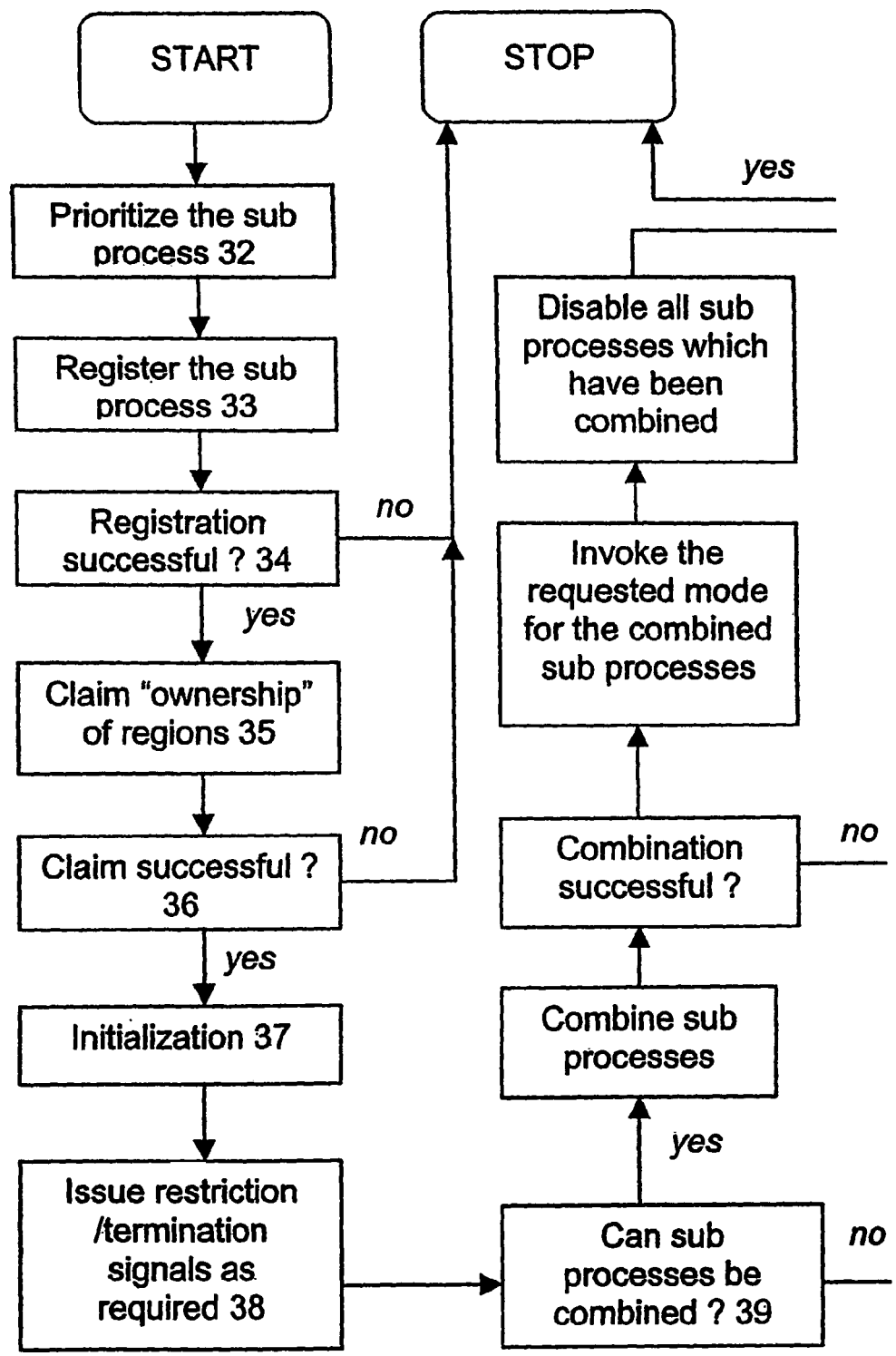
FIG. 4 illustrates a flow chart of the operations of a typical sub process.
Figure 4:
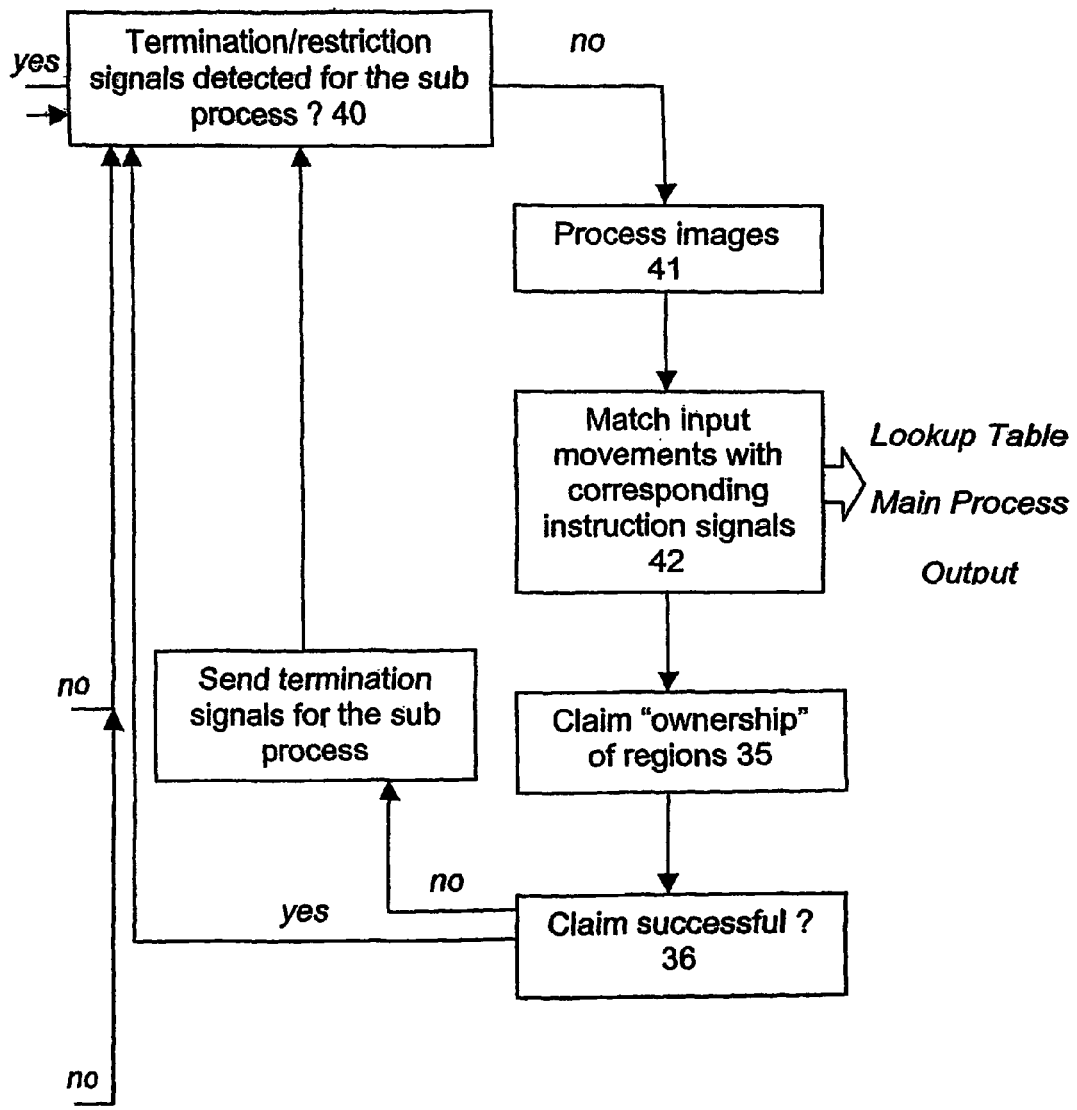

FIG. 4 is a flow chart illustrating a typical sub process 19. When a main process 18 invokes a sub process 19, it must be assigned a priority value 32. The assigning of a priority value occurs via a registration process 33 which assists the main process in management of any operating sub processes. By assigning priority values 32, a sub process 19 having a minor priority value is prevented from impeding a sub process 19 having a major priority value. The order of the priority value assigned to each sub process 19 is dependent on a number of factors including:

(a) how the sub process 19 was invoked, e.g. by a device or application software or by detected input movements;

(b) when the sub process 19 was requested;

(c) the original position of the input movement which invoked the sub process 19 on the contact surface 4; and (d) the mode requested for the sub process 19.

Once a sub process 19 has been prioritised, it is registered in a registration list 33. The registration list records data on registered sub processes 19 including sub process identification, modes, priorities and the identification of the main process 18 which initiated the sub process 19.

If registration of a sub process is unsuccessful 34, the sub processes cannot proceed. Failure of registration of a sub process 34 may arise because:

(a) the registration list is full;

(b) there are insufficient system resources available to execute the sub process, e.g. the random access memory (RAM) is full or a request for allocation of resources from another systems was denied;

(c) a registered sub process having a higher priority value issues a restriction signal affecting the sub process in question;

(d) there is insufficient stored information about the requested mode of operation, e.g. there is no predefined bank of instruction signals corresponding to the input movements; and (e) a particular device mode is requested and connection to the particular device is not detected.

On successful registration 34, a sub process claims "ownership" of a region 35 of the sensing panel 3 which corresponds to a region in each image frame. Once a region is claimed 35, any input movements received via that region will be processed by the sub process claiming "ownership". The registration process records claimed regions. If a particular region has been claimed by a sub process having a certain priority value, only that particular sub process or a sub process having a higher priority value can process input movements entered via that region. Unclaimed regions are accessed by all sub processes indiscriminately. A claim for a region is successful if the region is unclaimed or if it has been previously claimed by a sub process having a lower priority than the sub process currently seeking the claim.

Changes in "ownership" occur in one of two ways. The registration list may keep track of previous claims to regions of the sensing panel 3 so that when a sub process completes processing a particular input movement, the region is returned to the immediately previous "owner". For example, if a region was claimed by Sub Process 1 and then claimed by Sub Process 2 which has a higher priority than Sub Process 1 and is subsequently claimed by Sub Process 3 which has a higher priority value than Sub Process 2. After completion of Sub Process 3, the region reverts to Sub Process 2. If Sub Process 2 is completed then the region will revert to the next immediately previous "owner" being Sub Process 1. Once Sub Process 1, is complete, the region reverts to an unclaimed state. Alternatively, once a sub process is completed, any claimed regions automatically revert to unclaimed status. The region is then available to be claimed by a previous "owner" or any other sub process 19.

More than one sub process 19 may claim the same or part of the same region of the sensing panel 3 resulting in an overlap of regions claimed by independent sub processes. Sub processes claiming overlapping regions of the sensing panel 3 proceed on the basis of priority values.

Once a region has been successfully claimed, the sub process initializes assorted variables associated with the sub process 37. The sub process may issue restriction signals to enforce priority over other operating sub processes 38. At this point a sub process may be combined with other cooperative sub processes in order to process complex input movements 39.

The next step in the loop checks for termination or restriction signals which may arrest the sub process 40. As previously described, detection of a termination signal arrests the sub process. If a restriction signal effecting the sub process is detected, it is suspended until that signal has ceased.

If the sub process proceeds, i.e. no termination or restriction signals were detected; the sub process proceeds to process the regions of the image frames corresponding to the claimed areas 41 of the sensing panel 3. Image processing involves the deployment of known image processing techniques as described for the main process 18. Sub processes in different modes may have different approaches to processing image frames. It is to be understood that sub processes and main processes may also have different approaches to processing image frames in the same mode.

A sub process translates the input movements by searching the knowledge database 9 in an attempt to match the detected input movements with the bank of stored input movements and corresponding instruction signals 42. If a corresponding instruction signal is identified, it is provided to the main process for further processing, such as transmission to the computing system for output.

This loop is repeated until a termination signal is detected to arrest the sub process 40. A termination signal may arise externally to the system; from another sub process; may be derived from the sub process itself; or arise in response to failure in claiming a region of the sensing panel 3.

Figure 5:
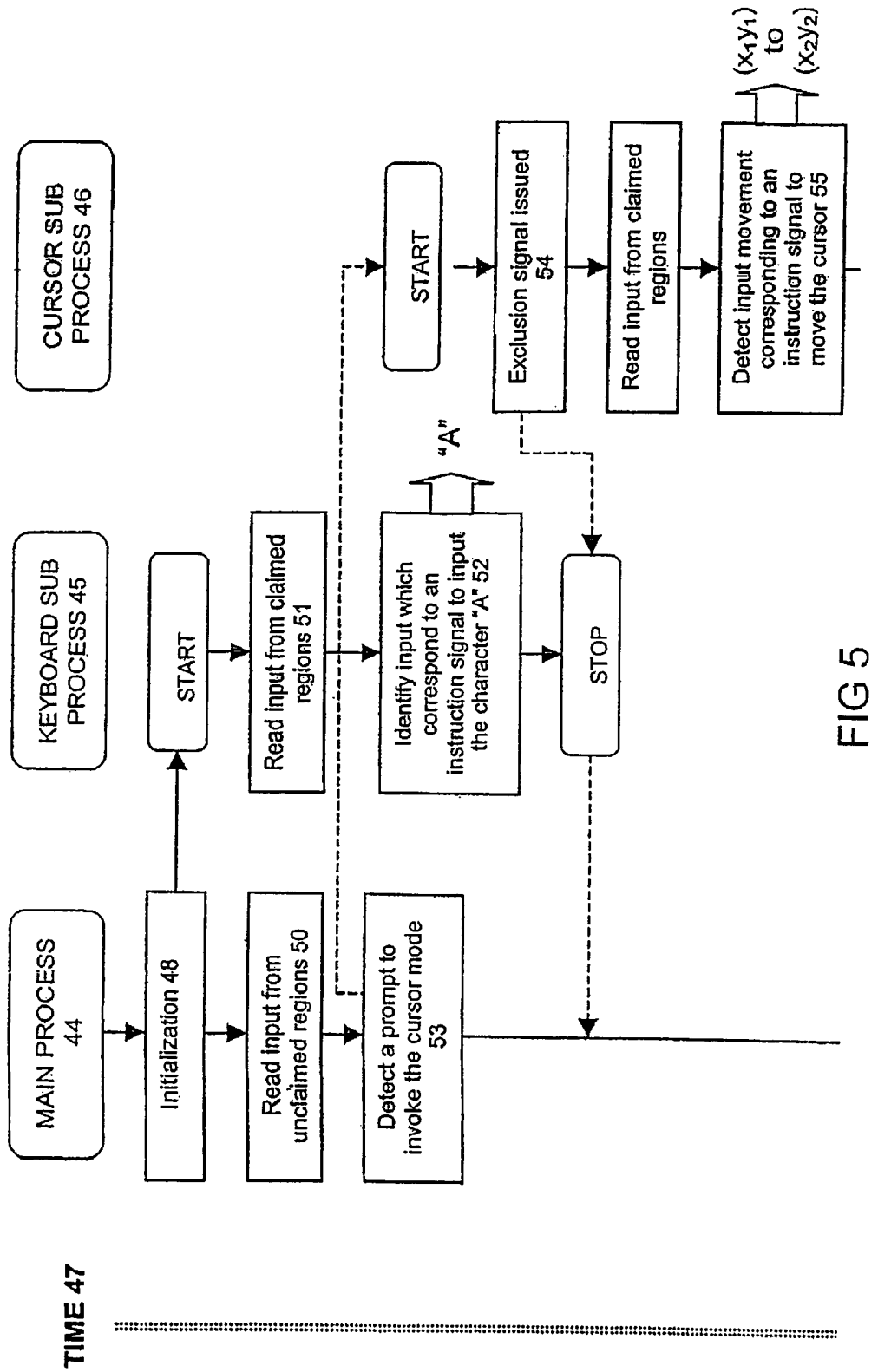
FIG. 5 illustrates a flowchart demonstrating the interaction between a main process and a keyboard sub process and a cursor sub process.
Figure 5:
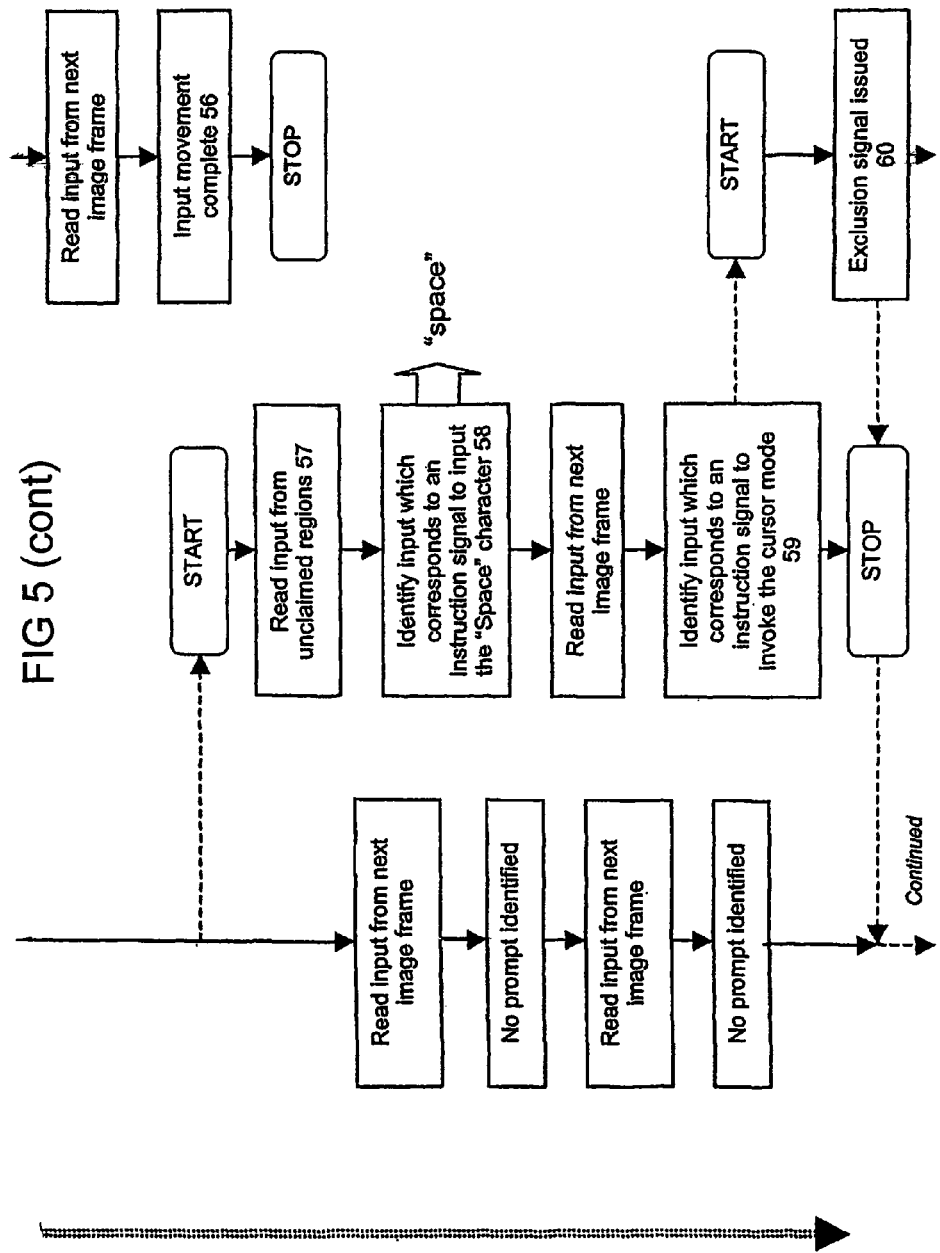

FIG. 5 exemplifies an interaction between a main process 44 and two sub processes 45,46. The cursor mode sub process 46 has a major priority whilst the keyboard mode sub process 45 has a minor priority. The cursor mode sub process 46 issues an exclusion signal 54 to prevent other sub processes from being executed whilst it is functioning.

FIG. 5 further includes a time sequence 47 to demonstrate the interaction between the processes over time. Once the main process 44 has undergone initialization 48, if no termination signals or restriction signals are detected to disable the keyboard mode sub process 45, the main process 44 automatically invokes the keyboard mode sub process 45 as the default sub process to enable user input.

The main process 44 operates concurrently to the keyboard mode sub process 44. The main process 44 detects input movements on unclaimed regions of the sensing panel 50 to locate new input movements, whilst the sub process 45 operates on a claimed region or regions of the sensing panel 3 to detect input movements designating keystrokes 51.

The sub process 45 identifies an input movement which corresponds to an instruction signal to input the character "A" 52. Therefore, the character "A" is transmitted to the computing system for output. The main process simultaneously detects a new input movement which indicates a prompt to invoke a cursor mode sub process 53. Since the cursor mode sub process 46 has a higher priority than the keyboard mode sub 45, an exclusion signal 54 is issued to prevent the keyboard mode sub process from being executed concurrently. Furthermore, the exclusion signal causes the main process 44 to manage the sub processes 45,46 without continuing to detect new input movements on unclaimed regions of the sensing panel.

The cursor mode sub process processes images to identify input movements designating a cursor movement 55. The sub process continues until a termination signal is detected 56. The termination signal may be provide via an input movement such as ceasing all contact with the sensing panel for a certain length of time. Once the cursor mode sub process has been disabled, the exclusion signals cease. Therefore, the main process 44 restarts the keyboard mode sub process 45. The keyboard mode sub process 45 reverts back to operating on the claimed region or regions of the sensing panel to locate input movements designating keystrokes 57. The sub process identifies an input movement corresponding to an instruction signal to input the "Space" character 58. Therefore, the "Space" character is transmitted to the computing system for output.

The keyboard mode sub process 45 then detects an input movement within the claimed region which designates a prompt to invoke the cursor mode sub process 59. The cursor mode sub process 46 issues an exclusion signal 60 to arrest the keyboard mode sub process 45.

Figure 6:
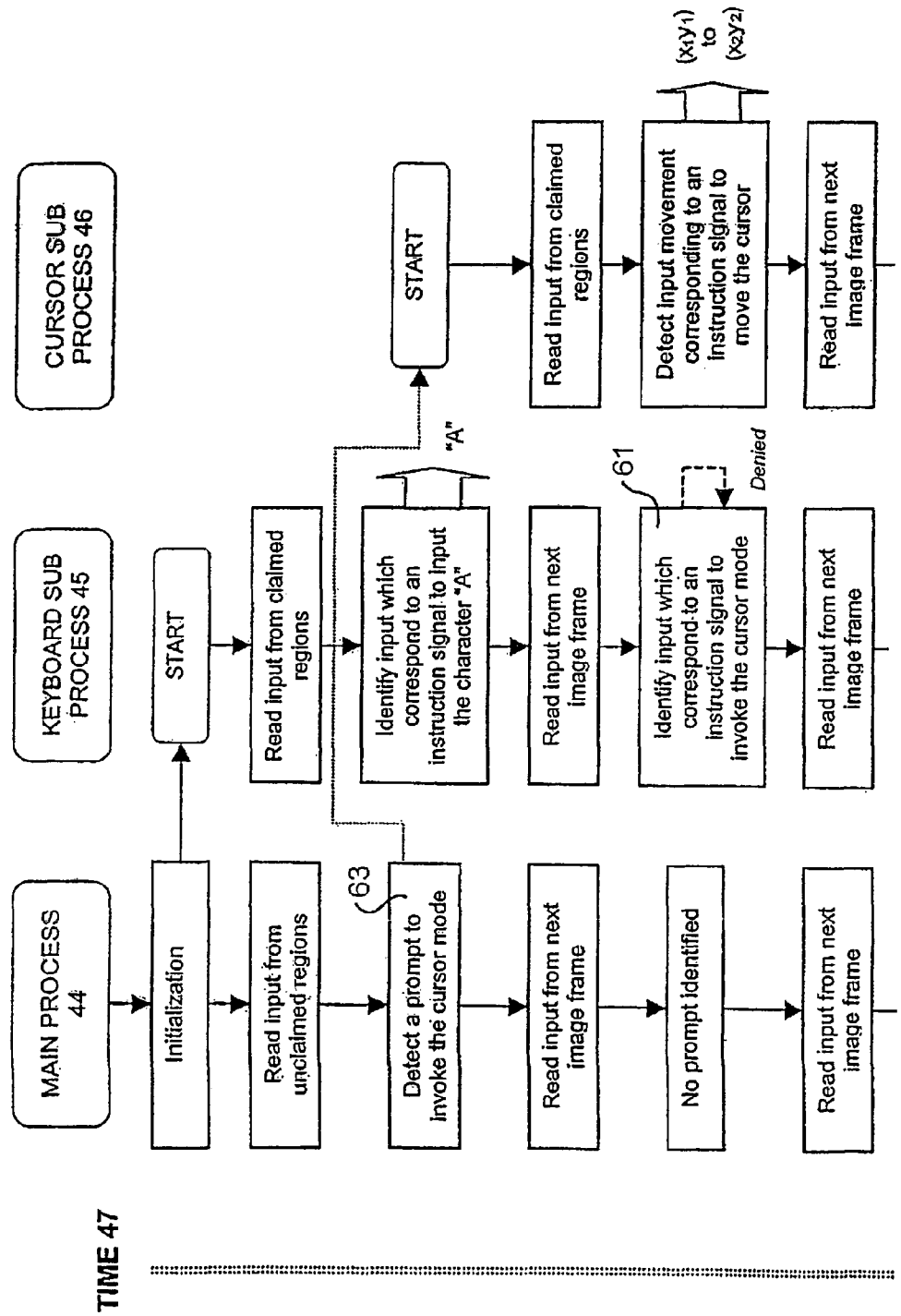
FIG. 6 illustrates a variation of the flowchart in FIG. 5.

FIG. 6 illustrates a variation of the example illustrated in FIG. 5. In this example, the cursor mode sub process 46 does not issue an exclusion signal. Therefore, the cursor mode sub process 46 and the keyboard mode sub process 45 may operate simultaneously. However, the cursor mode sub process 46 does issue a restriction signals to other cursor mode sub processes to enable only one cursor mode sub process 46 to operate at any one time. Therefore, when main process 44 or keyboard mode sub process 45 detect input movements designating a prompt to commence the cursor mode sub process, the request is denied 61. Once the cursor mode sub process 46 has been terminated, detection of another input movement designating a prompt to commence the cursor mode sub process 63 is granted.

Figure 7:
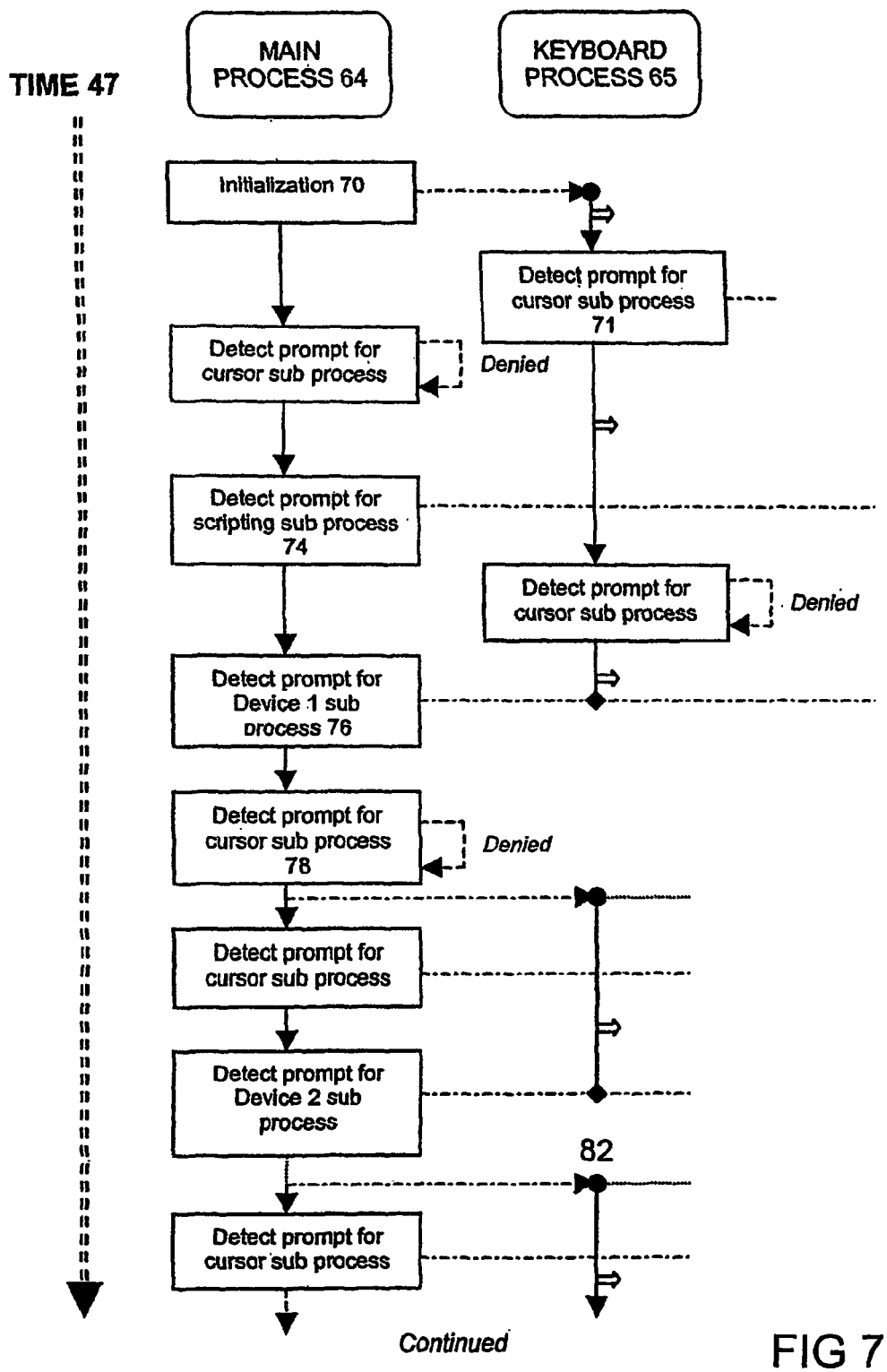
FIG. 7 illustrates a flowchart demonstrating the interaction between a main process and a number of sub processes.

FIG. 7 provides a more complex example, wherein five sub processes operate in various modes in conjunction with a main process. In this particular example the modes are keyboard, cursor and scripting modes and two device modes. Each mode is associated with a sub process 65, 66, 67, 68 and 69. The keyboard sub process 65 has the lowest priority value and the device 2 sub process 69 has the highest priority value. After initialization 70, the main process 64 invokes the default keyboard mode sub process 65. The keyboard mode sub process 65 detects input movements designating a prompt 71 to commence the cursor mode sub process 66. The cursor mode sub process 66 is invoked and issues a restriction signal 72 to arrest other cursor mode sub processes or the scripting mode sub process 67. The cursor sub process 66 continues to operate until a termination signal is detected 73. On arrest of the cursor mode sub process 66, the restriction signals inhibiting sub processes 66 and 67 cease.

Subsequently, the main process 64 detects an input movement designating a prompt 74 to commence the scripting mode sub process 67. The scripting mode sub process 67 issues a restriction signal 75 to the cursor mode sub process 66 and other scripting mode sub processes 67. Therefore, any subsequent requests to invoke the cursor mode sub process 66 are denied, whilst sub process 65 and 67 are executed.

The main process 64 later detects an input movement in an unclaimed region designating a prompt 76 for the device mode for ancillary device 1. Since device mode sub process 68 is not compatible with the keyboard mode sub process 65 it issues a restriction signal 77 to arrest the keyboard mode sub process 65. Moreover, the device mode sub process 68 prevents the cursor mode sub process 66 and scripting mode sub process 67 from being invoked. Later when an input movement designating a prompt 78 for invoking a new cursor mode sub process 66 by the main process 64, the request is denied. Once device mode sub process 68 is complete 79, the restriction signal ceases. The main process 64 immediately invokes the default mode keyboard mode sub process 65 and cursor mode sub process 66 in response to an appropriate prompt.

The main process 64 subsequently detects a prompt to invoke device mode sub process 69 for a second ancillary device. The device mode sub process 69 issues an exclusion signal 80 to arrest any other sub processes currently operating. The main process 64 does not detect input movements on unclaimed regions to identify input movements designating prompts to invoke other sub processes at this time. Therefore, instruction signals are only generated by device mode sub process 69. Once device mode sub process 69 is completed 81, the exclusion and restriction signals are ceased. The default keyboard mode sub process 65 is invoked 82 by the main process 64.

Figure 8:
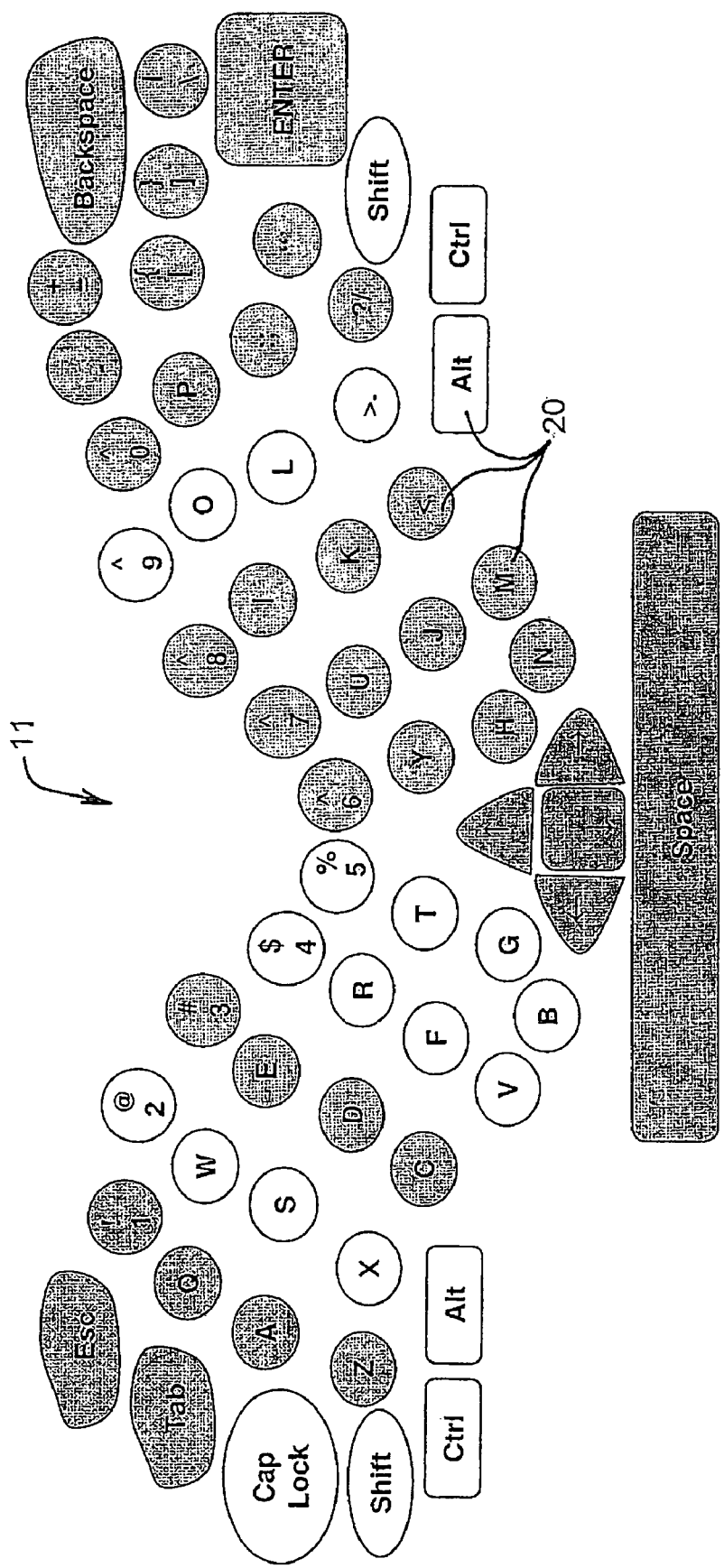
FIG. 8 illustrates a keyboard layout according to one embodiment of the invention.

FIG. 8 illustrates a keyboard layout 11 for use with the present invention. The keyboard layout 11 is based on the standard QWERTY layout. However, it is to be appreciated that a user may modify the keyboard layout 11 to suit individual needs. If modifications in layout are required, the keyboard layout 11 information stored in the knowledge database 9 may be updated as required. Where the sensing panel 3 includes a LCD layer 17 displaying the keyboard layout 11, any changes to the keyboard layout 11 will be reflected by the display. If the keyboard layout 11 is printed directly onto a layer of the sensing panel 3, it may be reprinted to replace the default arrangement.

Using the example of the QWERTY keyboard layout 11, at least five input movements are recognised. These include PKeyType, PKeyHold, PKeyType2, PkeyDoubleType and PKeyDoubleType2. Details of these input movements are described below.

Figure 9:
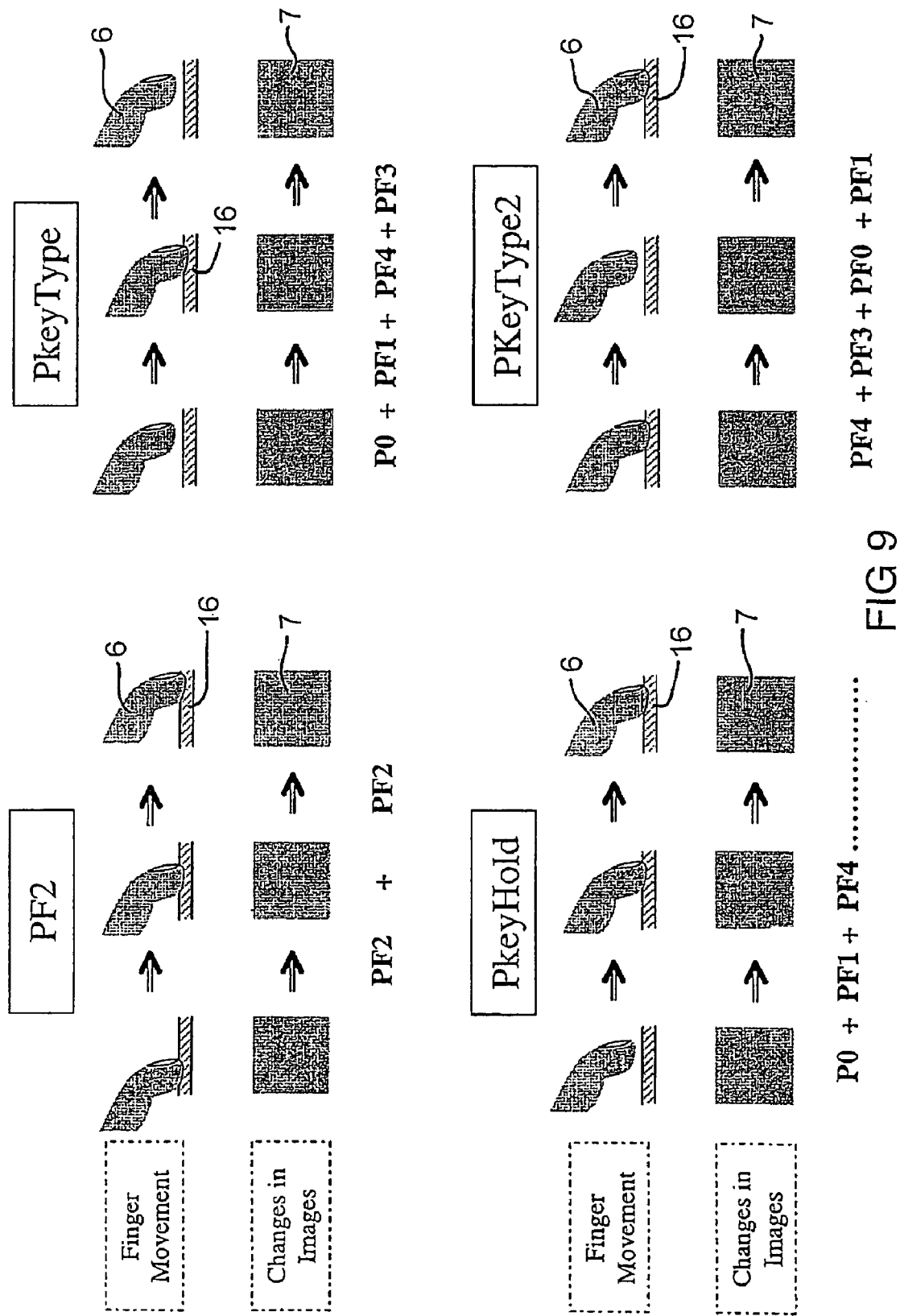
FIG. 9 illustrates examples of user input patterns used to provide input to a computing system in accordance with an embodiment of the invention.

FIG. 9 exemplifies some user input patterns which may be used to provide input to a computing system.

P0 indicates that no contact has been detected by the sensors 14 within the sensing panel 3.

PF1 indicates that a single finger 6 has been positioned on the contact surface 4 of the sensing panel 3. The placement of a single finger 6 on the contact surface 4 is sensed as a substantially elliptical form or impression 16 and recorded as such in the image 7. The image 7 records parameters such as the moment in time when the contact took place, the duration, size, position and perhaps colour or intensity of the impression 16.

PF2 indicates the detection of an input movement using a single finger 6. Detection of the input movement comprises detection of an original finger 6 position and a current finger 6 position resulting in a displacement vector representing the change between the two positions in distance and direction. Other attributes of the movement such as pressure and duration of contact may also be recorded.

PF3 designates removal of a finger 6 from the contact surface 4. This input movement is essentially an opposite input movement to that designated by PF1.

PF4 designates a finger 6 is positioned on the contact surface 4. The duration of the contact is recorded.

Based on the exemplary basic input movement patterns, more complex input movement patterns may be constructed. By means of example, some more complex input movements are described below.

FIG. 9 further illustrates the following input movements.

PKeyType is a sequence of P0+PF1+PF4+PF3, wherein the duration of PF4 is very brief and the recorded positions of PF1 and PF3 are in close proximity to one another. This input movement can be equated to pressing and instantly releasing a key 20 on a conventional keyboard.

PKeyHold is a sequence of P0+PF1+PF4. This input movement may be equated to pressing and holding down a key 20.

PKeyType2 is a sequence of PF4+PF3+P0+PF1 wherein the positions recorded for PF4, PF3 and PF1 are in close proximity and the duration of P0 is very short. This input movement may be equated with removing a user's finger 6 from an original position and rapidly returning it to the original position.

FIG. 10 exemplifies more input movements which may be used to provide input to a computing system for output.

PKeyDoubleType is a sequence of P0+PF1+PF4+PF3+ P0+PF1+PF1+PF4 wherein the duration of the first PF4 and the second P0 should be very short. This input movement may be otherwise interpreted as a PKeyType immediately followed by a PKeyHold, or pressing down a key 20 (see FIG. 8), releasing it, and then pressing the key 20 down again and holding it.

PKeyType2 is a sequence of PF4+PF3+P0+PF1+PF4+ PF3+P0+PF1+PF4. The duration of the P0 strokes and the P4 stroke are very short and the recorded positions of PF1, PF3 and PF4 are in close proximity. This type of sequence may be otherwise interpreted as a PKeyType2 sequence directly following an earlier PKeyType2 sequence, or lifting of a user's finger 6 twice from a maintained holding position.

FIG. 11 exemplifies yet more user input movements which may provide input to a computing system in accordance with the present invention.

PCursorRB is a sequence wherein two P0+PF1 sequences occur simultaneously and the recorded position of the two PF1s is adjacent to one another. This sequence mimics the act of placing two fingers 6 on the contact surface 4 side by side.

PCursorAB is similar to the PCursorRB except that one of the user's fingers 6 touches the contact surface 4 before the other. That is, the sequence of finger 1 is P0+PF1+PF4 whilst the sequence of finger 2 is P0+PF1 and the time difference between the two PF1s corresponds to the duration of PF4. The duration should be in some sort of predefined range, for example 0.6 to 2 seconds.

When a PKeyType input movement is detected in a position corresponding to a key 20 position, then the instruction signal transmitted to the computing system will be to produce an output of the character associated with that particular key 20. If a PKeyHold input movement is detected in a position associated with a functional key 20 such as "Ctrl", "Shift" or "Alt", then the keyboard mode sub process will incorporate the function into the instruction signal transmitted to the computing system until the input movement is no longer detected. However, if the same input movement is detected on a non functional key 20 such as "A", "5" or "Space", it will result in an instruction signal being transmitted to the computing system which does not result in any output. That is, if the users intention is to output a sequence of "A"s, the user must perform input movements such as PKeyDoubleType as previously described. A keyboard mode sub process then causes an instruction signal to be transmitted to the computing system resulting in an output of a sequence of "A"s until such time that a new input movement is detected such as lifting a finger 6 (PF3) or moving a finger 6 (PF2).

It is to be understood that the association between input movements and corresponding instruction signals is dynamic. That it, the knowledge database 9 may be redefined to adapt the input device 1 to preferences of individual users.

As described earlier, a user can prompt initiation of a cursor mode sub process by applying more than one finger 6 to the contact surface 4 in a PCursorRB or PCursorAB sequence. For instance, once a PCursorRB sub process is invoked, during initialization, the original position of the input movement is recorded. The position of the users fingers 6 on the contact surface 4 will be directly reflected by the position of the cursor on a computing system screen. For instance, placing the users fingers 6 in a top left hand corner of the contact surface 4 results in the cursor being positioned in the top left hand corner of the screen. If the resolution of the screen is $S_x \times S_y$ pixels, the resolution of the panel is $I_x \times I_y$ pixels and the original position of the fingers 6 on the panel is $(X_a, Y_a)$ and $(X_b, Y_b)$, the cursor will appear at position $$\left( \left[ \frac{Sx}{Ix} \times \frac{X_a + X_b}{2} \right], \left( \frac{Sy}{Iy} \times \frac{Y_a + Y_b}{2} \right) \right]$$

on the screen.

PKeyType2 input movements may simulate standard mouse operations such as clicking the right button, clicking the left button or double clicking a button. If no finger 6 contact is detected for any length of time, then a termination signal is issued to arrest the cursor mode sub process.

In another embodiment, a movement indicating device is provided for use with the input device 1 of the present invention. The sensing panel 3 may detect input movements delivered by the movement indicating device, whose movement across the surface of the panel designates an instruction signal to move a cursor for example, in the direction indicated by the movement indicating device. In one arrangement, the movement indicating device may take the form of a hemispherical device. The device is preferably substantially formed from or layered in a suitable resilient material which will provide cushioning support and tactile feedback to a users hand. The movement indicting device may be used to indicate movement as follows by guiding displacement of the movement indicating device on the contact surface 4 with a users hand.

(a) movement of the movement indicating device in the direction of the X axis;
(b) movement of the movement indicating device in the direction of the Y axis;
(c) the degree of tilt of the movement indicating device in the direction of the X axis;
(d) the degree of tilt of the movement indicating device in the direction of the Y axis;
(e) rotation of the movement indicating device; and
(f) application of downward pressure on the movement indicating device designates an instruction signal to move downwards and reducing the pressure applied to the movement indicating device designates an instruction signal to move upwards.

It will be appreciated that the movement indicating device described is particularly suited to providing input to a computing system for graphics applications such as three dimensional object design programs.

In another arrangement, the movement indicating device may simulate a string instrument. In this case, the device includes a frame with at least four strings. Each string designates a particular note for auditory output. The input movements will be the position of the users fingers 6 on the strings. The position of a finger 6 along the string indicates the pitch of the note designated by the selected string. The duration of contact with the string indicates the length of the note. Multiple finger 6 contacts on a single string are disregarded, only the highest pitch indicated by the input movement will be used to provide auditory output.

It is to be understood that various additions, alterations and/or modifications may be made to the parts previously described without departing from the ambit of the invention.

The invention claimed is:

1. A method of entering input into a computing system, the method comprising the following steps:
   detecting one or multiple input movements using a sensing panel associated with the computing system;
   classifying each detected input movement as being of a particular type;
   translating each input movement to an instruction signal by consulting a knowledge database; and
   transmitting the instruction signal to the computing system;
   wherein translation of a detected input movement to an instruction signal involves a main process and one or more sub-processes, the main process and the one or more sub processes together form a hierarchical control structure in which the main process determines whether an input movement corresponds to a prompt to invoke a particular mode, and where a particular mode is indicated, the main process invokes a sub process in that mode,
   each sub process is assigned to translate one or more particular input movements into corresponding instruction signals by consulting the knowledge database,
   the main process manages one or more sub processes by assigning a priority value such that a sub process having a minor priority value does not impede a sub process having a major priority value; and
   the whole sensing panel functions as a single sensing area and the main process and one or more sub-processes can be invoked regardless of the location of the detected input movement on the sensing panel.

2. A method of entering input into a computing system according to claim 1, wherein each particular type of input movement is associated with operation of the sensing panel in any one of the following modes:
   (a) keyboard modes;
   (b) mouse modes;
   (c) scripting modes;
   (d) device modes;
   (e) customer modes; and
   (f) idle mode.

3. A method of entering input into a computing system according to claim 2, wherein each invoked sub process claims a region of the sensing panel such that any input movements received via the claimed region of the sensing panel will be translated by the sub process having claimed the region.

4. A method of entering input into a computing system according to claim 3, wherein inputs received via a region having been claimed by a sub-process are translated only by the sub-process having claimed that region of the sensing panel, or by a sub-process having a higher priority value than the sub-process having claimed the region of the sensing panel.

5. A method of entering input into a computing system according to claim 4, wherein once the claiming sub process is complete, the claimed region reverts to an unclaimed status.

6. A method according to claim 4, wherein all sub processes can process input movements entered via unclaimed regions of the sensing panel.

7. A method according to claim 3, wherein a claim for a region is successful if the region is unclaimed or if it has been previously claimed by a sub process having a lower priority than the sub process currently seeking the claim.

8. A computer-readable recording medium encoded with a computer program, the computer program for use in a system for entering input into a computing system, the system comprising a processor and associated memory device for storing the computer software including a series of instructions to cause the processor to carry out a method according to claim 1.

9. An input device for use with a computing system for entering input into the computing system, the input device comprising a sensing panel and a transmission component for transmitting detected input movements to a processor to identify an instruction signal corresponding to the detected input movement in accordance with the method according to claim 1.

10. A method according to claim 1, wherein the order of the priority value assigned to each sub process is dependent on:
    (a) how the sub process was invoked;
    (b) when the sub process was requested;
    (c) an original position of the input movement which invoked the sub process on the sensing panel; and
    (d) a mode requested for the sub process.

11. A method according to claim 1, wherein once a sub process has been assigned a priority, it is registered in a registration list which records data including sub process identification, modes, and priorities.

12. A method according to claim 11, wherein the registration list further records claimed regions.

13. An input system for a computing system, the input system comprising:
    a sensing panel including an array of sensors for detecting input movements;
    a processor for classifying each detected input movement as being of a particular type and translating each input movement to an instruction signal for transmission to the computing system; and
    a knowledge database for consultation by the processor to identify the instruction signal corresponding to the detected input movement;
    wherein translation of a detected input movement to an instruction signal involves a main process and one or more sub-processes, the main process and the one or more sub processes together form a hierarchical control structure in which the main process determines whether an input movement corresponds to a prompt to invoke a particular mode, and where a particular mode is indicated, the main process invokes a sub process in that mode
    each sub process is assigned to translate one or more particular input movements into corresponding instruction signals by consulting the knowledge database,
    the main process manages one or more sub processes by assigning a priority value such that a sub process having a minor priority value does not impede a sub process having a major priority value; and
    the whole sensing panel functions as a single sensing area and the main process and one or more sub-processes can be invoked regardless of the location of the detected input movement on the sensing panel.

14. An input system according to claim 13, wherein each particular type of input movement is associated with operation of the sensing panel in any one of the following modes:
    (a) keyboard modes;
    (b) mouse modes;
    (c) scripting modes;
    (d) device modes;
    (e) customer modes; and
    (f) idle mode.

15. An input system according to claim 13, wherein the sensors for detecting input movements are light detecting sensors.

16. An input system according to claim 15, wherein the sensors for detecting input movements are complementary metal oxide semiconductor sensors.

17. An input system according to claim 15, wherein the sensors detect light patterns which are transformed into images and an input movement is detected when a first image differs from a subsequently formed second image.

18. An input system according to claim 13, further including a movement indicating device, wherein the input movements detected are the movements of the movement indicating device, the movement of which across the surface of the panel indicates an instruction signal to move in the direction indicated with the movement indicating device.

19. An input system according to claim 18, wherein an application of pressure to the movement indicating device causes an input movement which is interpreted by the processor as indicating an instruction signal to move downwards, and reducing the pressure applied to the movement indicating device causes an input movement which is interpreted by the processor as indicating an instruction signal to move upwards.

20. An input system according to claim 18, wherein the amount of pressure being applied to the movement indicating device is detected by reference to the size of an area of contact between the fingers or movement indicating device and the surface of the panel, or by reference to change in size of an area of contact between the fingers or movement indicating device and the surface of the panel.

21. An input system according to claim 13, wherein the sensing panel further includes a display layer for guiding user input.

22. An input system according to claim 13, wherein the knowledge database is dynamic to enable the association between an input movement and a corresponding instruction signal to be redefined to adapt the input system to preferences of an individual user.

* * * * *